(12) United States Patent
Jung et al.

(10) Patent No.: US 11,415,090 B2
(45) Date of Patent: Aug. 16, 2022

(54) INTAKE APPARATUS FOR INTERNAL COMBUSTION ENGINES

(71) Applicants: HYUNDAI MOTOR COMPANY, Seoul (KR); KIA MOTORS CORPORATION, Seoul (KR)

(72) Inventors: Jung-Wu Jung, Suwon-si (KR); Hyong-Do Chung, Anyang-si (KR); Sang-Jun Ahn, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 9 days.

(21) Appl. No.: 16/750,687

(22) Filed: Jan. 23, 2020

(65) Prior Publication Data
US 2021/0079875 A1    Mar. 18, 2021

(30) Foreign Application Priority Data
Sep. 17, 2019 (KR) .......................... 10-2019-0113989

(51) Int. Cl.
*F02M 35/10* (2006.01)

(52) U.S. Cl.
CPC .............. *F02M 35/10255* (2013.01); *F02M 35/10144* (2013.01)

(58) Field of Classification Search
CPC ............... F02M 35/10255; F02M 35/10144
USPC ............................................. 123/41.08
See application file for complete search history.

(56) References Cited

U.S. PATENT DOCUMENTS

| 4,862,840 A | * | 9/1989 | Matsunaga | F02B 27/02 |
| | | | | 123/184.55 |
| 2015/0330339 A1 | * | 11/2015 | Jung | F16K 11/20 |
| | | | | 137/624.27 |
| 2016/0326998 A1 | * | 11/2016 | Metz | F02M 25/06 |

FOREIGN PATENT DOCUMENTS

KR   10-2018-0102459 A   9/2018

* cited by examiner

*Primary Examiner* — Lindsay M Low
*Assistant Examiner* — Omar Morales
(74) *Attorney, Agent, or Firm* — Lempia Summerfield Katz LLC (57) ABSTRACT

An intake apparatus for an internal combustion engine may include: an air duct coupled to a front of an engine compartment, and having a first inlet and a second inlet formed on an outer side of the air duct and a passage space defined therein; and an integrated valve coupled to the air duct to selectively open and close the first inlet or the second inlet.

14 Claims, 7 Drawing Sheets

INTAKE APPARATUS FOR INTERNAL COMBUSTION ENGINES

CROSS-REFERENCE TO RELATED APPLICATION

This application claims priority to and the benefit of Korean Patent Application No. 10-2019-0113989, filed on Sep. 17, 2019, the entire contents of which are incorporated herein by reference.

FIELD

The present disclosure relates to an intake apparatus configured for an internal combustion engine to induce air into the engine.

BACKGROUND

The statements in this section merely provide background information related to the present disclosure and may not constitute prior art.

A vehicle suction system is a system that filters out dust from outside air and then supplies the filtered air to an engine, and includes an air duct for inducing outside air into an air filter (air cleaner).

Figure 1:
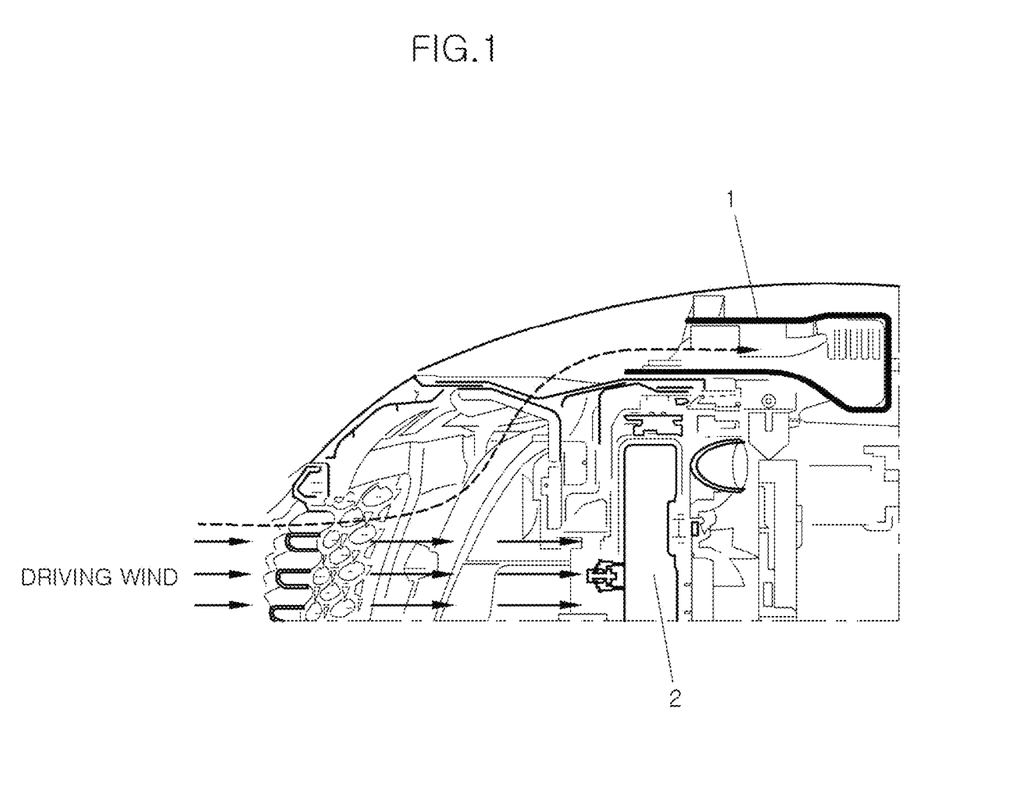
FIG. 1 illustrates introduction of air into an air duct of a typical suction system.

As illustrated in FIG. 1, during the operation of a vehicle, a driving wind is introduced into a radiator 2 through a radiator grill 3 (see FIG. 3) and induced through an inlet 1 of an air duct disposed thereabove.

A suction system is configured to direct the inlet outward in front of an engine compartment to receive cold air as much as possible, as illustrated in the drawing.

An intake air temperature, which is the temperature of the air sucked into the suction system, affects fuel efficiency and power performance. Since the driving wind is introduced while the vehicle travels, the intake air temperature is different between traveling and stopping.

A traveling intake air temperature is the temperature of the air sucked while the vehicle travels, and the lower the traveling intake air temperature, the better fuel efficiency and power performance.

That is, when the intake air temperature is reduced by 10° C., air density, torque, and fuel efficiency are increased by 3.3%, 3%, and 1%, respectively.

Here, the air density is calculated as follows.

$$\rho_{air} = \frac{P}{R \times T} \quad \rho_{air@33°\,C.} =$$

$$\frac{101325}{287.05 \times 306.15} = 1.153 \text{ kg/m}^3 \quad \rho_{air@23°\,C.} = 1.192 \text{ kg/m}^3$$

A stopping intake air temperature is the intake air temperature after a certain time elapses after the vehicle travels and then stops. In this case, since there is no driving wind to cool the engine compartment and supply cool air to the inlet, the stopping intake air temperature is higher than the traveling intake air temperature and further increased as the stop time becomes longer.

Figure 2:
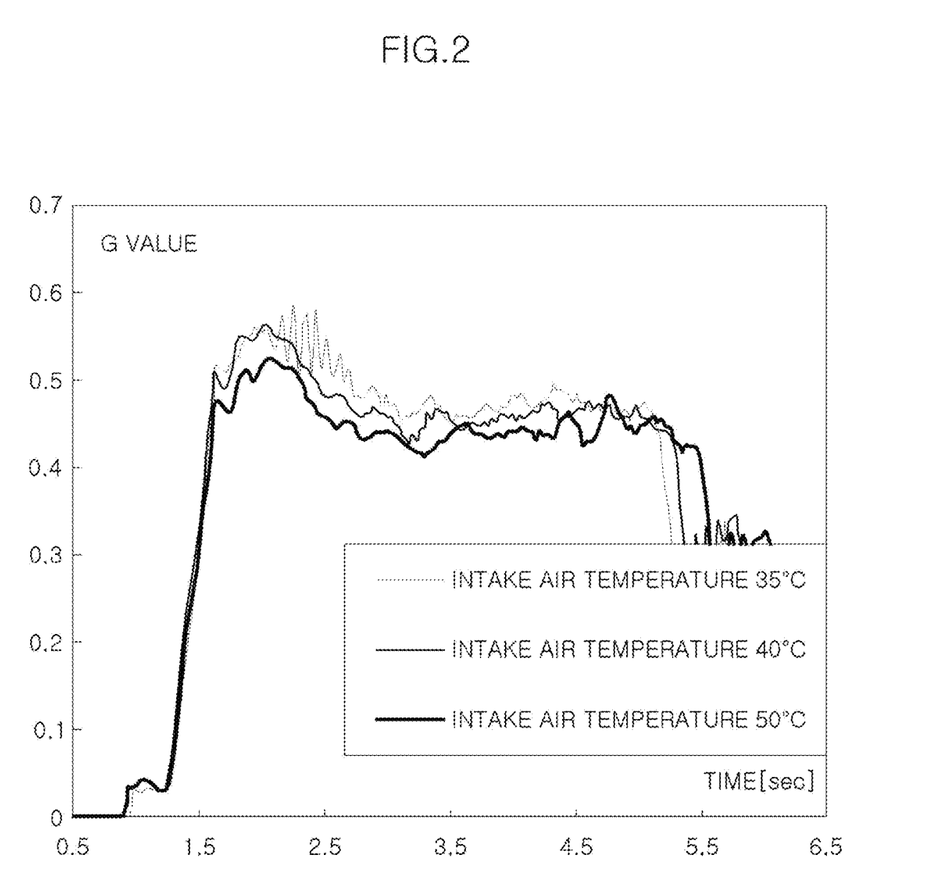
FIG. 2 illustrates G values according to the intake air temperature.

As referred to in FIG. 2, the difference in intake air temperature of 10° C. exhibits an acceleration performance of about 0.05 G. Here, the term "G" is a unit of start acceleration, and 1 G is 9.8 m/s².

On the other hand, if the inlet is directed outward in front of the engine compartment and snow or rain is excessively sucked thereinto while the vehicle travels, the engine may be damaged and stall. Therefore, we have discovered that it is desired to evaluate and verify water-tightness and snowfall durability and to increase a height difference from the grill step or install a separate bulkhead ahead of the inlet such that a driving wind is turned and introduced into the inlet.

Figure 3:
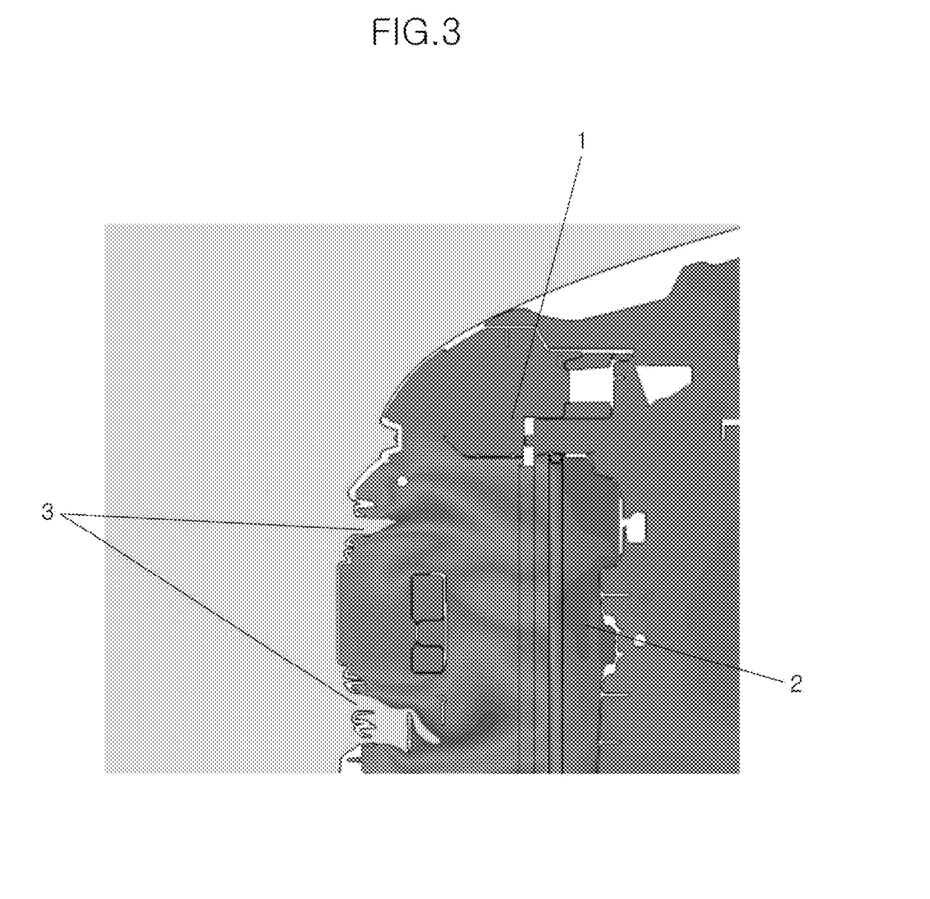
FIG. 3 illustrates temperature distribution around an inlet while a vehicle stops.

That is, as referred to in FIG. 3, when the vehicle stops, there is no risk of introduction of snow or rain as the driving wind disappears, but start performance at the time of restarting is deteriorated since the stopping intake air temperature is increased due to introduction of the hot air in the engine compartment into the inlet 1 through the gap between many parts such as the radiator 2, a vehicle body, and a headlamp.

We have also found that the result of heat distribution analysis around the inlet illustrated in the drawing shows that it may be advantageous to position the inlet 1 further down, but in this case, the engine may stall and be damaged due to introduction of snow or rain thereinto.

The foregoing is intended merely to aid in the understanding of the background of the present disclosure, and is not intended to mean that the present disclosure falls within the purview of the related art that is already known to those skilled in the art.

SUMMARY

The present disclosure provides an intake apparatus for internal combustion engines, which is capable of reducing an intake air temperature by sucking low-temperature air while a vehicle stops and of minimizing introduction of foreign substances while the vehicle travels.

Other objects and advantages of the present disclosure can be understood by the following description, and become apparent with reference to the forms of the present disclosure.

In accordance with one form of the present disclosure, an intake apparatus for an internal combustion engine of a vehicle includes: an air duct coupled to a front of an engine compartment of the vehicle, and having a first inlet and a second inlet formed on an outer side of the air duct and a passage space defined therein; and an integrated valve coupled to the air duct to selectively open and close the first inlet or the second inlet.

In another form, the air duct may include: a duct housing having the first inlet and the second inlet formed thereon; and a duct frame formed circumferentially on a side surface of the duct housing.

The second inlet may be formed on the lower surface of the duct housing, which is below the duct frame, and the first inlet may be formed on the upper surface of the duct housing, which is above the duct frame.

The first inlet may be formed upward on the upper surface of the duct housing, which is above the duct frame.

The integrated valve may include: a first switching part to open and close the first inlet, a second switching part to open and close the second inlet, and a rotary shaft axially coupled to the air duct.

In one form, the first switching part may include: a first region extending in parallel from the second switching part, and the rotary shaft may be formed to protrude laterally so that the first switching part is formed above the rotary shaft and the second switching part is formed below the rotary shaft.

The first switching part may further include a second region bent from the first region, and the second region may open and close the first inlet.

The first region may have a window formed therethrough.

The second switching part may be rotated rearward with respect to the rotary shaft by the force of driving wind introduced through a radiator grill to close the second inlet.

The second switching part may have an additional balance weight.

In one form, while the vehicle stops, the second switching part may be spaced apart from the second inlet such that the second inlet is open.

In accordance with another form of the present disclosure, an intake apparatus for an internal combustion engine for a vehicle includes: an air duct including a duct housing coupled to a front of an engine compartment of the vehicle, and a duct frame formed circumferentially on a side surface of the duct housing, where the duct housing has a first inlet and a second inlet formed on an outer side of the air duct, and a passage space defined therein, and an integrated valve coupled to the air duct to selectively open and close the first inlet or the second inlet. In particular, the integrated valve includes a second switching part to open and close the second inlet formed on a lower surface of the duct housing, which is below the duct frame, and a first switching part to open and close the first inlet formed on a upper surface of the duct housing, which is above the duct frame, the first and second switching parts being formed integrally with each other, and the first and second switching parts of the integrated valve are rotated relative to each other in opposite directions with respect to a rotary shaft coupled to the air duct between the first switching part and the second switching part.

The second switching part may be rotated rearward with respect to the rotary shaft by the force of driving wind introduced through a radiator grill to close the second inlet.

The second switching part may have an additional balance weight.

In one form, during the vehicle stops, the second switching part may be spaced apart from the second inlet such that the second inlet is open.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The accompanying drawings for illustrating exemplary forms of the present disclosure should be referred to in order to gain a sufficient understanding of the present disclosure, the merits thereof, and the objectives accomplished by the implementation of the present disclosure.

In the exemplary forms of the present disclosure, techniques well known in the art or repeated descriptions may be reduced or omitted to avoid obscuring appreciation of the disclosure by a person of ordinary skill in the art.

Figure 4:
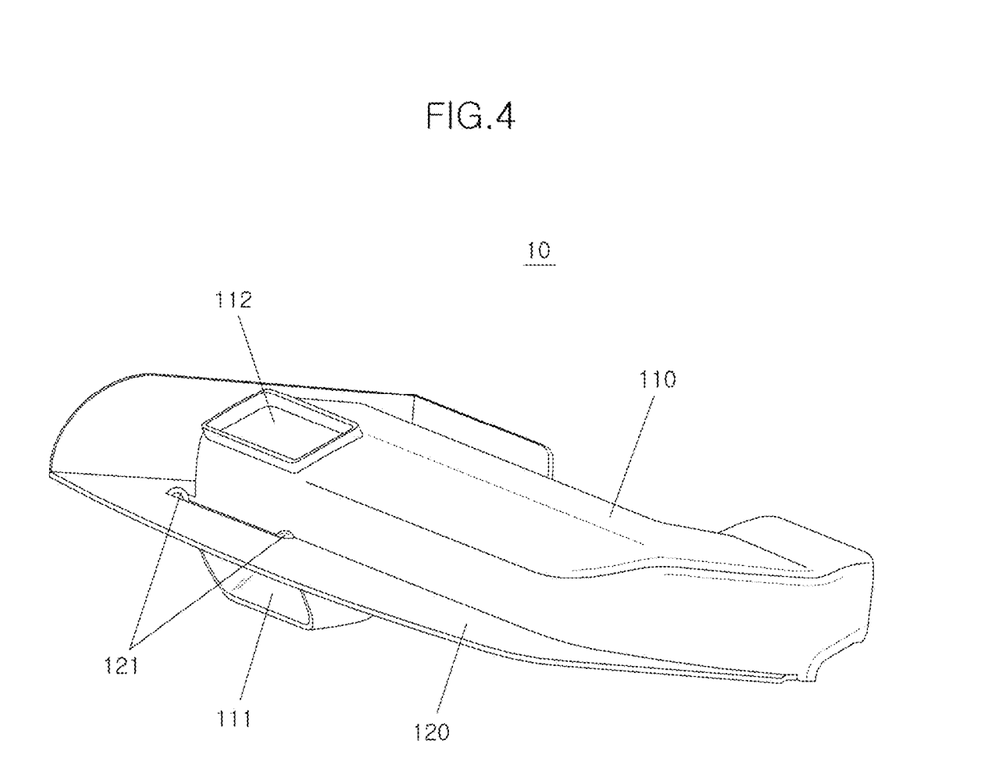
FIG. 4 illustrates a constituent air duct of an intake apparatus for internal combustion engines according to one form of the present disclosure.
Figure 5:
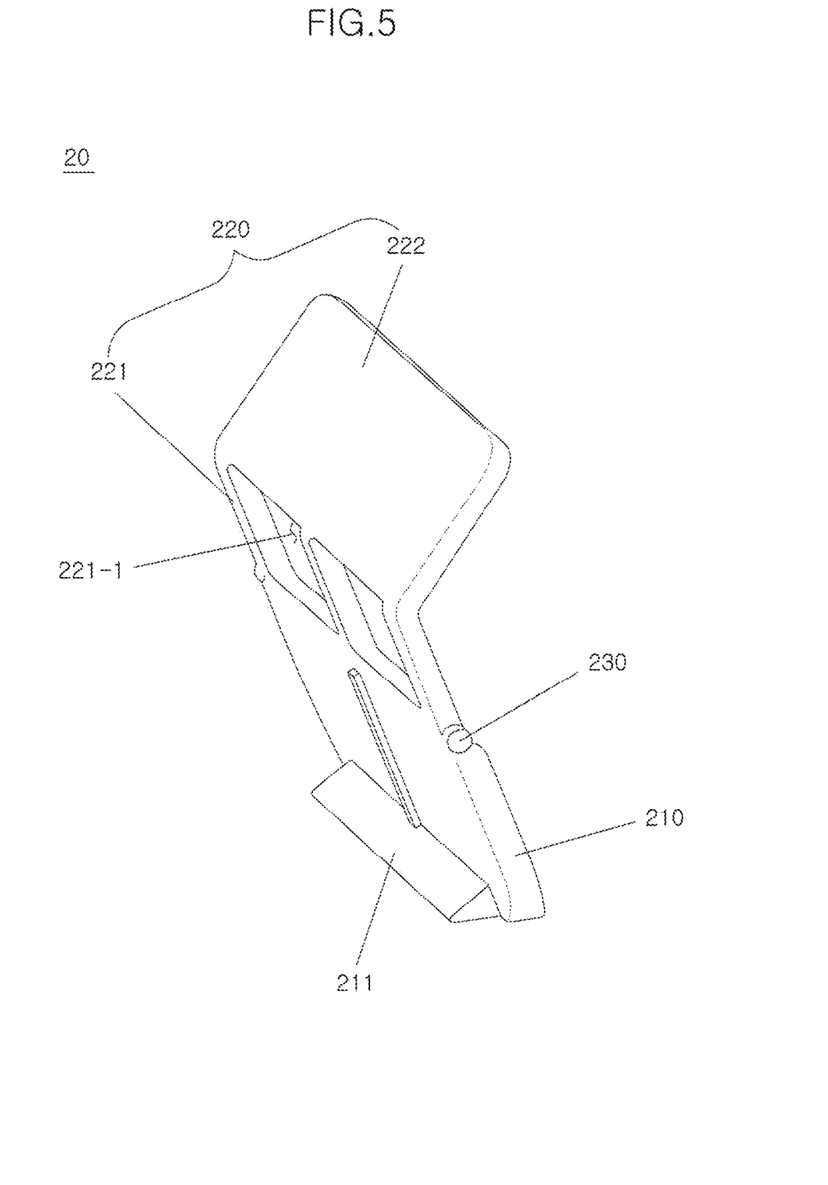
FIG. 5 illustrates a constituent integrated valve of the intake apparatus for internal combustion engines according to one form of the present disclosure.

FIG. 4 illustrates a constituent air duct of an intake apparatus for internal combustion engines according to one form of the present disclosure. FIG. 5 illustrates a constituent integrated valve of the intake apparatus for internal combustion engines according to one form of the present disclosure.

Hereinafter, the intake apparatus for internal combustion engines according to exemplary forms of the present disclosure will be described with reference to FIGS. 4 and 5.

The intake apparatus for internal combustion engines is provided at the front end of a suction system to induce outside air introduced through a radiator grill into an air filter. The intake apparatus has double inlets through which air is introduced while a vehicle travels and stops, to lower an intake air temperature by introducing low-temperature air in the lower portion of the vehicle favorable to the intake air temperature, as referred to in the temperature distribution of FIG. 3, during stopping and to prevent introduction of foreign substances by introducing air through an inlet with less fear of introduction of foreign substances during traveling.

To this end, the intake apparatus for internal combustion engines according to the present disclosure includes an air duct 10 illustrated in FIG. 4 and an integrated valve 20 illustrated in FIG. 5.

The air duct 10 is coupled to the front of an engine compartment, and includes a duct housing 110 and a duct frame 120 which are formed integrally with each other.

The duct housing 110 has a first inlet 112 and a second inlet 111 formed on the outer side thereof and a space as an air passage defined therein, to deliver the air sucked through the first and second inlets 112 and 111.

The duct frame 120 is provided in the form of a plate formed circumferentially in the middle of the side surface of the duct housing 110.

The second inlet 111 is formed on the lower surface of the duct housing, which is below the duct frame 120, and the first inlet 112 is formed on the upper surface of the duct housing, which is above the duct frame 120.

In order to guide intake air, the second inlet 111 may be formed obliquely on the lower surface of the duct housing, which is below the duct frame 120, and the first inlet 112 is formed upward on the upper surface of the duct housing, which is above the duct frame 120.

In the present disclosure, the air duct 10 is configured to suck air through the double inlets 111 and 112 in a different manner during traveling and stopping. To this end, the intake apparatus includes the integrated valve 20 for selectively opening and closing the first inlet 112 and the second inlet 111.

The integrated valve 20 is axially coupled to rotary shaft holders 121 formed in the duct frame 120. For the configuration of the rotary shaft holders 121, the duct frame 120 is spaced apart from the duct housing 110 at the point between the first inlet 112 and the second inlet 111 to form a groove between the duct frame 120 and the duct housing 110. The groove has a length corresponding to the width of each inlet 111 or 112 so that the annular rotary shaft holders 121 are formed on both inner surfaces of the groove.

The integrated valve 20 includes a first switching part 220, a second switching part 210, and a rotary shaft 230 which are integrally formed with each other. The second switching part 210 is formed below the rotary shaft 230 and the first switching part 220 is formed above the rotary shaft 230.

The first switching part 220 and the second switching part 210 are provided in a single plate shape, and the first switching part 220 includes a first region 221 extending in parallel from the second switching part 210 and a second region 222 bent and extending rearward from the first region 221.

In one form, the first and second switching parts 220 and 221 may have a size corresponding to the width of each inlet 111 or 112 to selectively open and close the first inlet 112 and the second inlet 111.

The rotary shaft 230 is provided in the form of a protrusion protruding laterally, so that the rotary shaft 230 is inserted into the annular rotary shaft holders 121 to rotate the integrated valve 20 about the rotary shaft 230.

In another form, the first switching part 220 is spaced apart from the first inlet 112 to open the first inlet 112 when the second switching part 210 closes the second inlet 111, whereas the first switching part 220 is operated to close first inlet 112 when the second switching part 210 opens the second inlet 111.

As will be described later, when the second switching part 210 closes the second inlet 111, the second switching part 210 is rotated rearward by the force of driving wind introduced through the radiator grill while the vehicle travels, thereby closing the second inlet 111.

In order to smoothly operate the integrated valve 20, the second switching part 210 may have an additional balance weight 211 protruding from the front lower side thereof.

The shape, position, size, etc. of the balance weight 211 may be different from those illustrated in the form to adjust an opening and closing timing.

Meanwhile, the division of the first switching part 220 into the first and second regions 221 and 222 is to consider the formation position of the first inlet 112. That is, the first switching part 220 is configured to open and close the first inlet 112 because the first inlet 112 is formed upward on the upper surface of the duct housing 110. Therefore, the bending angle of the second region 222 with respect to the first region 221 may vary depending on the shapes of the duct housing 110 and the first inlet 112.

That is, the size, bending angle, etc. of the second region 222 are formed correspondingly according to the distance from the duct frame 120 to the first inlet 112 and the angle at which the first inlet 112 is formed obliquely upward.

The first region 221 has a window 221-1 formed therethrough, so that when the first inlet 112 is opened, the air sucked through the first region 221 may be introduced into the first inlet 112.

As described above, the intake apparatus for internal combustion engines according to the present disclosure enables outside air to be sucked selectively while the vehicle travels and stops, in such a manner that the second switching part 210 moves rearward to close the second inlet 111 and the first switching part 220 opens the first inlet 112 during traveling, whereas the second switching part 210 opens the second inlet 111 and the first switching part 220 closes the first inlet 112 during stopping.

Figure 6:
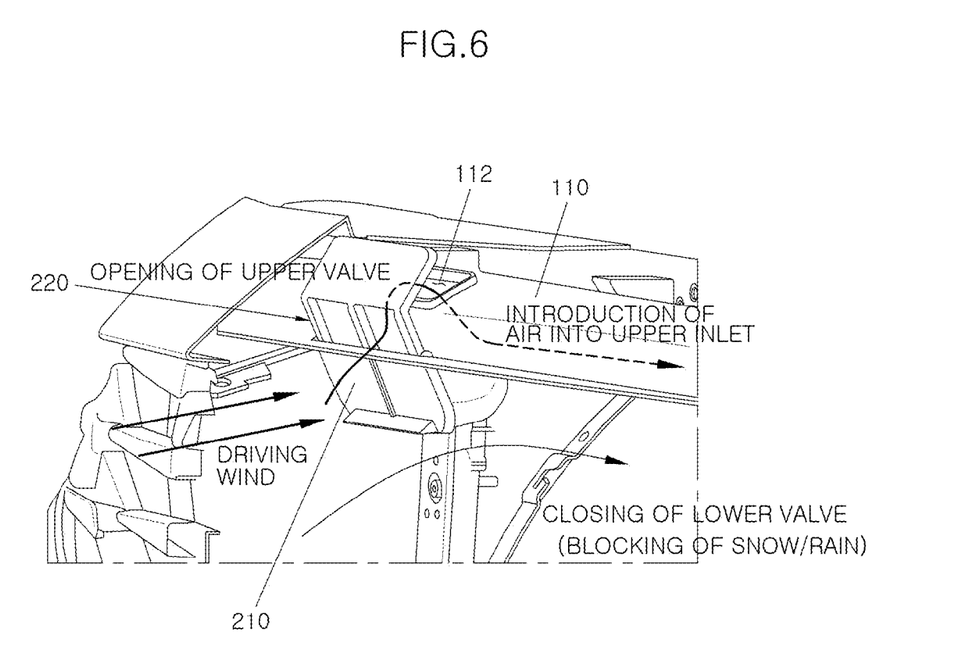
FIG. 6 illustrates a state of the intake apparatus for internal combustion engines while a vehicle travels according to one form of the present disclosure.
Figure 7:
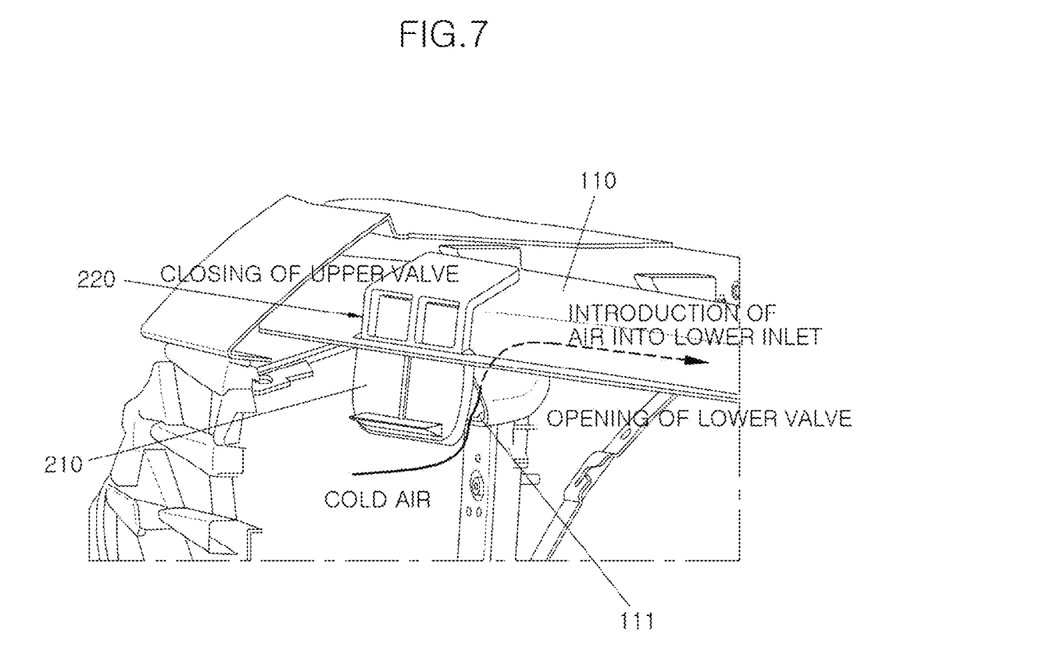
FIG. 7 illustrates a state of the intake apparatus for internal combustion engines while the vehicle stops according to one form of the present disclosure.

FIGS. 6 and 7 illustrate such an operation state. FIG. 6 illustrates that the vehicle travels and FIG. 7 illustrates that the vehicle stops.

First, referring to FIG. 6, while the vehicle travels, a driving wind is introduced through the radiator grill and the second switching part 210 of the integrated valve 20 is rotated rearward by the force of the driving wind to close the second inlet 111 of the duct housing 110, thereby blocking introduction of foreign substances, such as snow or rain, into the air duct 10.

On the other hand, the first switching part 220 is rotated forward with respect to the rotary shaft 230 to open the first inlet 112, and the driving wind is introduced into the first inlet 112 through the window 221-1 formed on the first region 221.

Referring to FIG. 7, since there is no driving wind while the vehicle stops, the second switching part 210 is rotated forward by the weight of the integrated valve 20 or the weight of the balance weight 211 to open the second inlet 111.

Thus, air is introduced through the second inlet 111. Referring to the temperature distribution of FIG. 3, since the second inlet 111 is disposed at a position capable of sucking low-temperature air, the temperature of air sucked through the second inlet 111 is reduced than before.

On the other hand, the first switching part 220 is rotated reward with respect to the rotary shaft 230 to close the first inlet 112, thereby preventing introduction of upper hot air.

The intake apparatus for internal combustion engines according to the present disclosure is operated as described above to improve the idle intake air temperature by about 5° C. to improve the start performance at the time of restarting after stopping by about 5 to 10%.

In accordance with exemplary forms of the present disclosure, the intake apparatus for internal combustion engines has the double inlets of the first inlet and the second inlet. The integrated valve closes one of the first and second inlets and opens the other of them while the vehicle travels and stops, so that outside air can be introduced into the first inlet while the vehicle travels whereas outside air can be naturally introduced through the second inlet while the vehicle stops.

Therefore, it is possible to lower the temperature of air sucked while the vehicle stops to more efficiently improve fuel efficiency and power performance.

Since there is no problem with the introduction of cool outside air due to the driving wind while the vehicle travels, the first inlet is opened to receive the outside air and the second inlet is simultaneously closed to block the introduction of snow or rain from the driving wind. Since there is no possibility of introduction of snow or rain because of no driving wind while the vehicle stops, the second inlet is opened to smoothly introduce cold outside air and the first inlet is simultaneously closed to block the introduction the hot air in the engine compartment thereinto, thereby lowering the intake air temperature during stopping.

While the specific forms have been described with reference to the drawings, the present disclosure is not limited thereto. It will be apparent to those skilled in the art that various changes and modifications may be made without departing from the spirit and scope of the present disclosure. Therefore, these changes and modifications will fall within the scope of the disclosure as long as they are apparent to those skilled in the art, and the scope of the present disclosure should be defined based on the entire content set forth in the appended claims.

What is claimed is:

1. An intake apparatus for an internal combustion engine for a vehicle, the intake apparatus comprising:
    an air duct having a first inlet and a second inlet formed on an outer side of the air duct; and
    an integrated valve coupled to the air duct and configured to selectively open and close the first inlet or the second inlet based on whether the vehicle travels or stops,
    wherein:
    when the vehicle travels, the first inlet is opened and the second inlet is closed, and outside air of the vehicle is directly introduced to the vehicle through the first inlet while the outside air is blocked from introducing to the vehicle through the second inlet, and
    when the vehicle stops, the first inlet is closed and the second inlet is opened,
    wherein the integrated valve comprises:
        a first switching part configured to open and close the first inlet;
        a second switching part configured to open and close the second inlet; and
        a rotary shaft axially coupled to the air duct, and
    wherein the rotary shaft is formed to protrude laterally so that the first switching part is formed above the rotary shaft and the second switching part is formed below the rotary shaft.

2. The intake apparatus of claim 1, wherein the air duct comprises:
    a duct housing having the first inlet and the second inlet formed thereon; and
    a duct frame formed circumferentially on a side surface of the duct housing.

3. The intake apparatus of claim 2, wherein the first inlet is formed on an upper surface of the duct housing, which is above the duct frame, and the second inlet is formed on a lower surface of the duct housing, which is below the duct frame.

4. The intake apparatus of claim 3, wherein the first inlet is formed upward on the upper surface of the duct housing.

5. The intake apparatus of claim 1, wherein:
    the first switching part comprises a first region extending in parallel from the second switching part.

6. The intake apparatus of claim 5, wherein the first switching part further comprises a second region bent from the first region, and the second region is configured to open and close the first inlet.

7. The intake apparatus of claim 5, wherein the first region has a window formed therethrough.

8. The intake apparatus of claim 1, wherein the second switching part is rotated rearward with respect to the rotary shaft by a force of the outside air introduced through a radiator grill to close the second inlet.

9. The intake apparatus of claim 1, wherein the second switching part has an additional balance weight.

10. The intake apparatus of claim 1, wherein while the vehicle stops, the second switching part is spaced apart from the second inlet so as to open the second inlet.

11. An intake apparatus for an internal combustion engine for a vehicle, the intake apparatus comprising:
    an air duct comprising:
        a duct housing having a first inlet and a second inlet formed on an outer side of the air duct, and
        a duct frame formed circumferentially on a side surface of the duct housing; and
    an integrated valve coupled to the air duct and configured to selectively open and close the first inlet or the second inlet based on whether the vehicle travels or stops,
    wherein:
    the integrated valve comprises:
        a first switching part configured to open and close the first inlet formed on an upper surface of the duct housing, which is above the duct frame,
        a second switching part configured to open and close the second inlet formed on a lower surface of the duct housing, which is below the duct frame, the first and second switching parts being formed integrally with each other,
    the first and second switching parts of the integrated valve are rotated relative to each other in opposite directions with respect to a rotary shaft coupled to the air duct between the first switching part and the second switching part,
    when the vehicle travels, the first inlet is opened and the second inlet is closed, and outside air of the vehicle is directly introduced to the vehicle through the first inlet while the outside air is blocked from introducing to the vehicle through the second inlet and
    when the vehicle stops, the first inlet is closed and the second inlet is opened so as to allow the outside air to introduce to the vehicle through the second inlet,
    wherein the rotary shaft is formed to protrude laterally so that the first switching part is formed above the rotary shaft and the second switching part is formed below the rotary shaft.

12. The intake apparatus of claim 11, wherein the second switching part is rotated rearward with respect to the rotary shaft by a force of the outside air introduced through a radiator grill to close the second inlet.

13. The intake apparatus of claim 11, wherein the second switching part has an additional balance weight.

14. The intake apparatus of claim 11, wherein while the vehicle stops, the second switching part is spaced apart from the second inlet such that the second inlet is open.

* * * * *